United States Patent
Vanevenhoven et al.

(10) Patent No.: US 11,702,222 B2
(45) Date of Patent: Jul. 18, 2023

(54) DC CONTACTOR INPUT INTO RAT AUTO-DEPLOY

(71) Applicant: Hamilton Sundstrand Corporation, Charlotte, NC (US)

(72) Inventors: Jordan K. Vanevenhoven, Rockford, IL (US); Jeffrey D. Myroth, Roscoe, IL (US); Shane R. Traser, Rockford, IL (US); Jef William Good, German Valley, IL (US); John N. Buzzard, Rockford, IL (US); Kyle Ives, Loves Park, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 438 days.

(21) Appl. No.: 16/822,840

(22) Filed: Mar. 18, 2020

(65) Prior Publication Data

US 2021/0292001 A1 Sep. 23, 2021

(51) Int. Cl.
*B64D 41/00* (2006.01)
*H02J 3/38* (2006.01)

(52) U.S. Cl.
CPC .......... *B64D 41/007* (2013.01); *H02J 3/381* (2013.01); *F05D 2270/09* (2013.01)

(58) Field of Classification Search
CPC .................................................. B64D 41/007
See application file for complete search history.

(56) References Cited

U.S. PATENT DOCUMENTS

| | | | |
|---|---|---|---|
| 7,759,821 B2 | 7/2010 | Lando et al. | |
| 8,820,677 B2 | 9/2014 | Rajashekara et al. | |
| 9,083,201 B2 | 7/2015 | Bauer et al. | |
| 9,114,888 B2 | 8/2015 | Swearingen et al. | |
| 9,511,728 B2 | 12/2016 | Shander et al. | |
| 10,493,930 B2 | 12/2019 | Shander et al. | |
| 2012/0245746 A1* | 9/2012 | Swearingen | B64D 41/007 290/44 |
| 2014/0032002 A1* | 1/2014 | Iwashima | G05B 13/02 700/295 |
| 2020/0017232 A1* | 1/2020 | Compton | B64D 41/00 |

OTHER PUBLICATIONS

Extended European Search Report dated Jul. 26, 2021, issued during the prosecution of European Patent Application No. EP 21163533.9.

* cited by examiner

*Primary Examiner* — Daniel Cavallari
(74) *Attorney, Agent, or Firm* — Locke Lord LLP; Joshua L. Jones; Scott D. Wofsy

(57) ABSTRACT

A system includes a first AC bus configured to supply power from a first AC power source. A second AC bus is configured to supply power from a second AC power source. A first transformer rectifier unit (TRU) connects a first DC bus to the first AC bus through a first TRU contactor (TRUC). A second TRU connects a second DC bus to the second AC bus through a second TRUC. A ram air turbine (RAT) automatic deployment controller is operatively connected to the first TRUC and to the second TRUC to automatically deploy a RAT based on the combined status of the first TRUC and the second TRUC.

9 Claims, 3 Drawing Sheets

DC CONTACTOR INPUT INTO RAT AUTO-DEPLOY

BACKGROUND

1. Field

The present disclosure relates to power distribution systems, and more particularly to AC essential busses such as used in aerospace applications.

2. Description of Related Art

Traditionally, ram air turbine (RAT) automatic deployment (auto-deploy) has been performed based on generator line contactor status. This does not take into consideration system configurations when an AC power source is available to provide power to the AC buses but is not available to power the DC buses. This can ultimately rely on airmanship to recognize the condition and manually deploy the RAT.

The conventional techniques have been considered satisfactory for their intended purpose. However, there is an ever present need for improved systems and methods for power distribution. This disclosure provides a solution for this need.

SUMMARY

A system includes a first AC bus configured to supply power from a first AC power source. A second AC bus is configured to supply power from a second AC power source. A first transformer rectifier unit (TRU) connects a first DC bus to the first AC bus through a first TRU contactor (TRUC). A second TRU connects a second DC bus to the second AC bus through a second TRUC. A ram air turbine (RAT) automatic deployment controller is operatively connected to the first TRUC and to the second TRUC to automatically deploy a RAT based on the combined status of the first TRUC and the second TRUC.

An AC essential bus tie contactor (AETC) can selectively connecting between an AC essential bus and the first and second AC busses. An AETC controller can be connected to switch the AETC between a first state connecting the AC essential bus to the first AC bus and a second state connecting the AC essential bus to the second AC bus.

A first DC essential bus can be connected to the first DC bus through a first essential contactor (EC). A second DC essential bus can be connected to the second DC bus through a second EC. An essential TRU can be connected to a third DC essential bus through an essential TRUC. A first essential tie contactor (ETC) can connect between the first essential bus and the third essential bus. A second ETC can connect between the third essential bus and the second essential bus, wherein the RAT automatic deployment controller is operatively connected to the first ETC and to the second ETC to automatically deploy the RAT based on the combined status of the first ETC, the second ETC, the first TRUC, the second TRUC, the essential TRUC, the first essential contactor, and the second essential contactor.

Respective auxiliary channels of the first ETC, the second ETC, the first TRUC, the second TRUC, the essential TRUC, the first essential contactor, and the second essential contactor in some combination can be operatively connected in a daisy chain to the RAT automatic deployment controller. It is also contemplated that respective auxiliary channels of the first ETC, the second ETC, the first TRUC, the second TRUC, the essential TRUC, the first EC contactor, and the second EC can be operatively connected individually to the RAT automatic deployment controller. The RAT automatic deployment controller can be configured to deploy the RAT, e.g., if the following conditions are all met: the first TRUC is open; the second TRUC is open; the essential TRUC is open; and an aircraft onboard which the RAT is located is in air mode.

A ram air turbine (RAT) line contactor can connect between the AETC and the AC essential bus to selectively connect a RAT to the AC essential bus. A RAT line contactor auxiliary channel can be connected in parallel to the auxiliary channel of essential TRUC.

A system can include a first AC bus configured to supply power from a first AC power source. A second AC bus can be configured to supply power from a second AC power source. A first transformer rectifier unit (TRU) can connecting a first DC essential bus to the first AC bus through a first contactor. A second TRU can connect a second DC essential bus to the second AC bus through a second contactor. A ram air turbine (RAT) automatic deployment controller can be operatively connected to the first contactor and to the second contactor to automatically deploy a RAT based on the combined status of the first contactor and the second contactor. The first contactor can be downstream of a first transformer rectifier unit (TRU) connecting a first DC bus to the first AC bus through a first TRU contactor (TRUC). The second contactor can be downstream of a second TRU connecting the second DC bus to the second AC bus through a second TRUC.

A method of distributing power includes supplying power to at least one of a first DC bus and a second DC bus from at least one of a first AC bus, a second AC bus and/or an essential AC bus. The method includes automatically deploying a ram air turbine (RAT) even if the none of the first AC bus, second AC bus, and the essential bus are available for the first and second DC buses, even though at least one of the first AC bus, second AC bus, and essential AC bus is online.

Automatically deploying the RAT can include not having a human user deploy the RAT. Automatically deploying the RAT need only be performed if the following logical condition is met: an air mode is detected for an aircraft onboard which the RAT is located; a first transformer rectifier unit contactor (TRUC) selectively connecting the first AC bus to the first DC bus is open; a second TRUC selectively connecting the second AC bus to the second DC bus is open; an essential TRUC selectively connecting an essential AC bus to an essential DC bus is open; and logic for a one or more other contactors indicates for RAT deployment.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
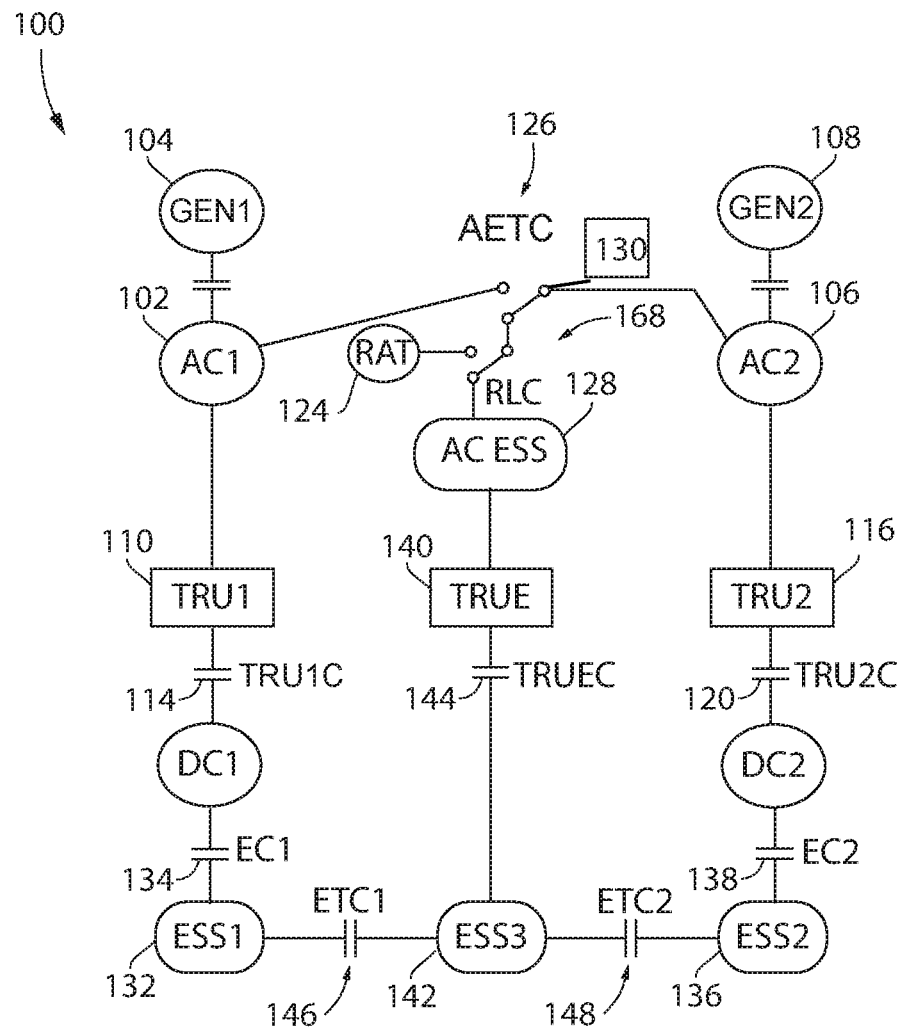
FIG. 1 is a schematic view of an embodiment of a system constructed in accordance with the present disclosure, showing the buses and contactors.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2a-4, as will be described. The systems and methods described herein can be used to deploy a ram air turbine (RAT) in a scenario where an AC power source is available to power the AC buses, but is not available to power the DC buses. A RAT can be used to convert ram air to electricity to provide aircraft electrical power in case normal sources of electric power are unavailable due to a component or system failure.

The system 100 includes a first AC bus 102 configured to supply power from a first AC power source such as the first generator 104. A second AC bus 106 is configured to supply power from a second AC power source, e.g. the second generator 108. A first transformer rectifier unit (TRU) 110 connects a first DC bus 112 to the first AC bus 102 through a first TRU contactor (TRUC) 114. A second TRU 116 connects a second DC bus 118 to the second AC bus 106 through a second TRUC 120. A ram air turbine (RAT) automatic deployment controller 122 (shown in FIGS. 2 and 3) is operatively connected by auxiliary channels to the first TRUC 114 and to the second TRUC 120 to automatically deploy a RAT 124 based on the combined status of the first TRUC 114 and the second TRUC 120, among other things described herein. The first transformer rectifier unit (TRU) 110 converts AC power from the first AC bus 102 to DC power and provides DC power to the first DC essential bus 132 through TRUC 114 and EC 134 (described below). The second TRU 116 similarly converts AC power from the second AC bus 106 to DC power and provide DC power to a second DC essential bus 136 through the TRUC 120 and EC 138 (described below).

With continued reference to FIG. 1, an AC essential bus tie contactor (AETC) 126 selectively connects between an AC essential bus 128 and the first and second AC busses 102, 106. An AETC controller 130 can be connected to switch the AETC 126 between a first state connecting the AC essential bus 128 to the first AC bus 102 and a second state connecting the AC essential bus 128 to the second AC bus 106.

A first DC essential bus 132 is connected to the first DC bus 112 through a first essential contactor (EC) 134. A second DC essential bus 136 is connected to the second DC bus 118 through a second EC 138. An essential TRU 140 is connected to a third DC essential bus 142 through an essential TRUC 144. A first essential tie contactor (ETC) 146 connects between the first essential bus 132 and the third essential bus 142. A second ETC 148 connects between the third essential bus 142 and the second essential bus 136. The RAT automatic deployment controller 122 is operatively connected to the first ETC 146 and to the second ETC 148 to automatically deploy the RAT 124 based on the combined status of the first ETC 146, the second ETC 148, the first TRUC 114, the second TRUC 120, the essential TRUC 144, the first EC 134, and/or the second EC 138.

Figure 2A:
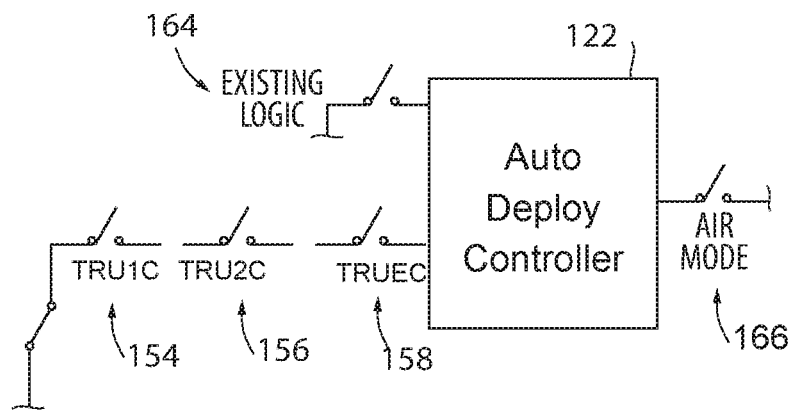
FIGS. 2a-2c are schematic views of portions of the system of FIG. 1, showing the auxiliary channels connecting in daisy chain configurations.
Figure 2B:
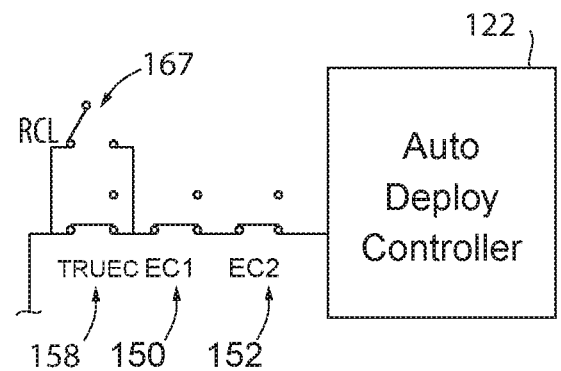
Figure 2C:
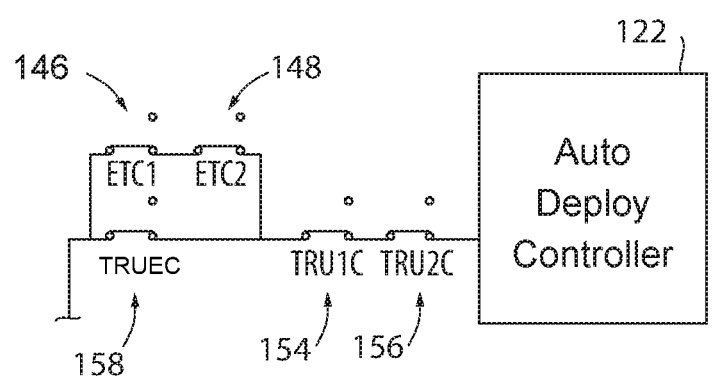

With reference now to FIGS. 2a-c, respective auxiliary channels 150, 152, 154, 156, 158, 160, 162, of the first ETC 146, the second ETC 148, the first TRUC 114, the second TRUC 120, the essential TRUC 144, the first EC 134, and the second EC 138 can be operatively connected in various daisy chain schemes to the RAT automatic deployment controller 122. Additional logic 164, e.g. including existing or traditional logic, as well as an air mode auxiliary channel 166 indicative of whether the system 100 is airborne, i.e. on board a flying aircraft, can each connect separately to the controller 122. The air mode 166 may be implemented as part of the existing logic 164. In FIG. 2a, the auxiliary channels 154, 156, 158 are connected in a daisy chain to the controller 122. In FIG. 2b, the EC channels 134 and 138 are used in place of the TRUC channels 154, 156. This also accommodates a channel 167 for a RAT line contactor (RLC) in parallel with the TRUC channel 158, which can be a means of keeping the input to the controller 122 active in case the input is also used for emergency condition indications. In FIG. 2c, the ETC channels 146, 148 are used. Here, the RAT 124 can be deployed if channels 154, 156, 146, and 148 are all open, even if the channel 158 is closed. The usefulness of this architecture can depend on if the auto-deploy controller input is used for other things, such as emergency condition indication or if ETC control can be based on RAT availability. In the daisy chain configurations shown in FIG. 2a-2c, the daisy chain drives its own logic.

Figure 3:
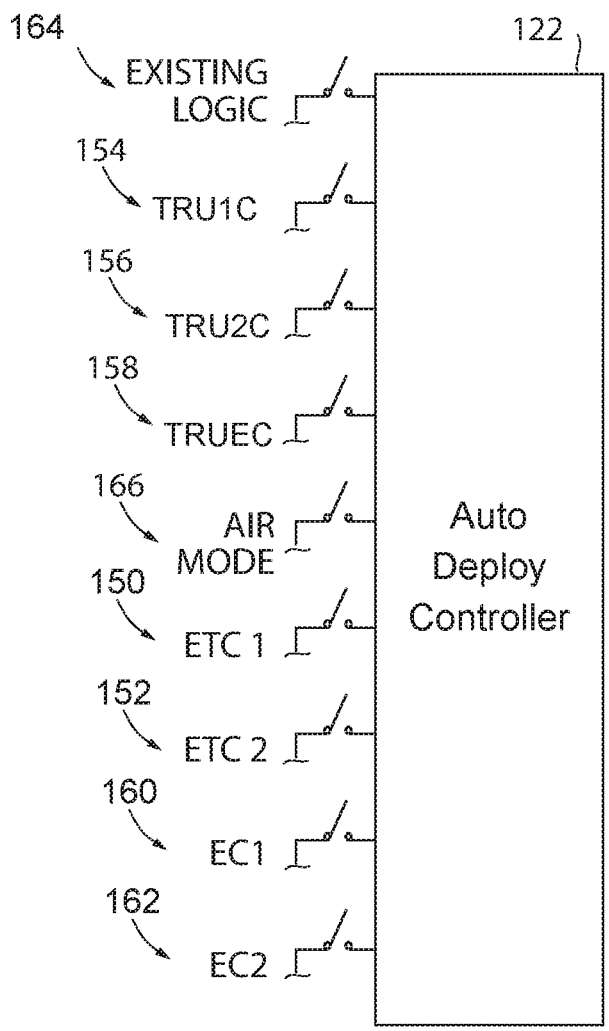
FIG. 3 is a schematic view of a portion of the system of FIG. 1, showing the auxiliary channels connecting in a second configuration.
Figure 4:
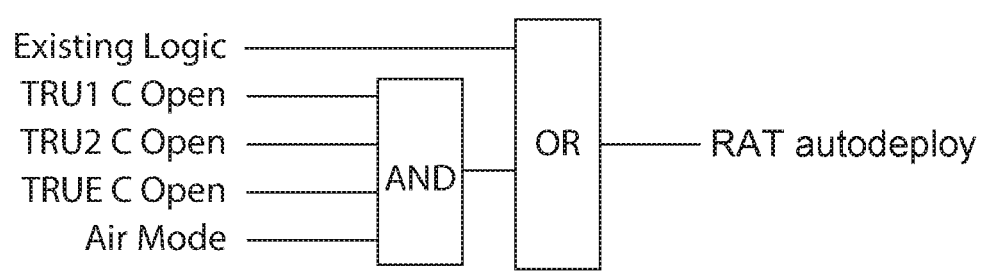
FIG. 4 is a schematic view of logic for controlling the system of FIG. 1.

It is also contemplated that respective auxiliary channels 150, 152, 154, 156, 158, 160, 162 can be operatively connected individually (separately from one another) to the RAT automatic deployment controller 122, as shown in FIG. 3. In this parallel configuration, internal logic of the controller 122 can be used in lieu of the inherent logic of the daisy chain configuration of FIGS. 2a-c. Regardless of whether a daisy chain is used, the RAT automatic deployment controller 122 can be configured to deploy the RAT 124, e.g., if the following conditions are all met: the first TRUC 114 is open; the second TRUC 120 is open; the essential TRUC 144 is open; and the aircraft (onboard which the RAT 144 is located) is in air mode.

A ram air turbine (RAT) line contactor 168 connects between the AETC 126 and the AC essential bus 128 to selectively connect the RAT 124 to the AC essential bus 128, e.g. responsive to a RAT generator control unit. A RAT line contactor auxiliary channel can be connected in parallel to the respective auxiliary channels in either the configuration of FIGS. 2a-3 to maintain indication of the emergency condition if the input being used for auto-deploy is also used for emergency status indication. Rather than of relying on all of the auxiliary channels 150, 152, 154, 156, 158, 160, 162 it is possible for the controller 122 to use only the upstream auxiliary channels 154, 156, 158 for the TRUCs 114, 120, 144. The logic for this control scheme is shown schematically in FIG. 4. It is also contemplated that the controller 122 can be configured to rely only on auxiliary channels 160, 162 of downstream contactors 134,138, as proxies for the upstream contactors 114, 120.

A method of distributing power includes supplying power to at least one of a first DC bus (e.g. first DC bus 112, DC essential bus 132, and/or DC essential bus 142) and a second DC bus (e.g. second DC bus 118, DC essential bus 136, and/or DC essential bus 142) from at least one of a first AC bus 102, a second AC bus 106 and/or an essential AC bus 128. The method includes automatically deploying a RAT 124 if none of the first AC bus, second AC bus, and the essential bus are available for the first and second DC buses, even though at least one of the first AC bus, second AC bus, and essential AC bus is online.

Automatically deploying the RAT can include not having a human user deploy the RAT. Automatically deploying the RAT need only be performed if the following logical condition is met: an air mode is detected for an aircraft onboard which the RAT is located; a first transformer rectifier unit contactor (TRUC) selectively connecting the first AC bus to the first DC bus is open; a second TRUC selectively connecting the second AC bus to the second DC bus is open; and an essential TRUC selectively connecting an essential AC bus to an essential DC bus is open. Other logic can be used for automatically deploying the RAT, as described herein.

The methods and systems of the present disclosure, as described above and shown in the drawings, provide for deployment of a ram air turbine (RAT) in a scenario where an AC power source is available to power the AC buses, but is not available to power the DC buses. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A system comprising:
   a first AC bus configured to supply power from a first AC power source;
   a second AC bus configured to supply power from a second AC power source;
   a first transformer rectifier unit (TRU) connecting a first DC bus to the first AC bus through a first TRU contactor (TRUC);
   a second TRU connecting a second DC bus to the second AC bus through a second TRUC;
   a ram air turbine (RAT) automatic deployment controller operatively connected to the first TRUC and to the second TRUC to automatically deploy a RAT based on the combined status of the first TRUC and the second TRUC
   an AC essential bus tie contactor (AETC) selectively connecting between an AC essential bus and the first and second AC busses;
   an AETC controller connected to switch the AETC between a first state connecting the AC essential bus to the first AC bus and a second state connecting the AC essential bus to the second AC bus
   a first DC essential bus connected to the first DC bus through a first essential contactor (EC); and
   a second DC essential bus connected to the second DC bus through a second EC, wherein the RAT automatic deployment controller is operatively connected to the first essential contactor and to the second essential contactor to automatically deploy the RAT based on the combined status of the first TRUC, the second TRUC, the first EC, and the second EC.

2. The system as recited in claim 1, further comprising an essential TRU connected to a third DC essential bus through an essential TRUC, wherein the RAT automatic deployment controller is operatively connected to the essential TRUC to automatically deploy the RAT based on the combined status of the first TRUC, the second TRUC, the essential TRUC, the first EC, and the second EC.

3. The system as recited in claim 2, further comprising:
   a first essential tie contactor (ETC) connecting between the first essential bus and the third essential bus; and
   a second ETC connecting between the third essential bus and the second essential bus, wherein the RAT automatic deployment controller is operatively connected to the first ETC and to the second ETC to automatically deploy the RAT based on the combined status of the first ETC, the second ETC, the first TRUC, the second TRUC, the essential TRUC, the first essential contactor, and the second essential contactor.

4. The system as recited in claim 3, wherein respective auxiliary channels of the first ETC, the second ETC, the first TRUC, the second TRUC, the essential TRUC, the first essential contactor, and the second essential contactor in some combination are operatively connected in a daisy chain to the RAT automatic deployment controller.

5. The system as recited in claim 3, wherein respective auxiliary channels of the first ETC, the second ETC, the first TRUC, the second TRUC, the essential TRUC, the first EC contactor, and the second EC are operatively connected individually to the RAT automatic deployment controller.

6. The system as recited in claim 3, wherein the RAT automatic deployment controller is configured to deploy the RAT if the following conditions are all met:
   the first TRUC is open;
   the second TRUC is open;
   the essential TRUC is open; and
   an aircraft onboard which the RAT is located is in air mode, wherein automatically deploying the RAT includes not having a human user deploy the RAT.

7. The system as recited in claim 6, further comprising a ram air turbine (RAT) line contactor connecting between the AETC and the AC essential bus to selectively connect a RAT to the AC essential bus.

8. The system as recited in claim 7, wherein a RAT line contactor auxiliary channel is connected in parallel to the auxiliary channel of with the essential TRUC.

9. The system as recited in claim 6, wherein automatically deploying the RAT is only performed if the following logical condition is met:
   an air mode is detected for an aircraft onboard which the RAT is located;
   a first transformer rectifier unit contactor (TRUC) selectively connecting the first AC bus to the first DC bus is open;
   a second TRUC selectively connecting the second AC bus to the second DC bus is open;
   an essential TRUC selectively connecting an essential AC bus to an essential DC bus is open; and
   logic for a one or more other contactors indicates for RAT deployment.

* * * * *